United States Patent [19]

Thakrar et al.

[11] Patent Number: 5,433,898
[45] Date of Patent: Jul. 18, 1995

[54] METHOD OF MANUFACTURING A CONTACT LENS

[75] Inventors: Ashok R. Thakrar, San Jose; Khushroo Gandhi, Sunnyvale, both of Calif.

[73] Assignee: Pilkington Barnes Hind, Inc., Sunnyvale, Calif.

[21] Appl. No.: 944,891

[22] Filed: Sep. 11, 1992

[51] Int. Cl.⁶ .............................................. B29D 11/00
[52] U.S. Cl. ...................... 264/1.7; 264/1.8; 264/2.7
[58] Field of Search .................. 264/1.7, 1.8, 2.1, 2.3, 264/2.7

[56] References Cited

U.S. PATENT DOCUMENTS

| | | | |
|---|---|---|---|
| 3,697,629 | 10/1972 | Bronstein | 264/1.8 |
| 3,984,506 | 10/1976 | Tsuetaki | 264/1.8 |
| 4,197,266 | 4/1980 | Clark et al. | 264/2.3 |
| 4,208,362 | 6/1980 | Deichert et al. | 264/1.7 |
| 4,460,523 | 7/1984 | Neefe | 264/1.7 |
| 4,710,327 | 12/1987 | Neefe | 264/1.7 |
| 4,710,328 | 12/1987 | Neefe | 264/1.7 |
| 4,921,205 | 5/1990 | Drew, Jr. et al. | 264/1.7 |
| 5,246,634 | 9/1993 | Ichikawa et al. | 264/1.7 |
| 5,258,144 | 11/1993 | Yean et al. | 264/1.7 |

*Primary Examiner*—Mathieu D. Vargot
*Attorney, Agent, or Firm*—Burns, Doane, Swecker & Mathis

[57] ABSTRACT

Methods of manufacturing a contact lens form a mold which has a first section formed from a first material and a second section formed from a second material. The methods permit the facile preparation of contact lenses having two or more differing materials, for example, a composite lens, a bifocal lens, a trifocal lens and the like.

26 Claims, 2 Drawing Sheets

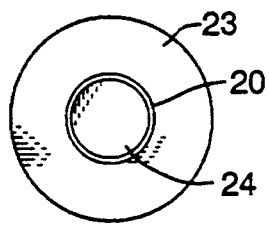
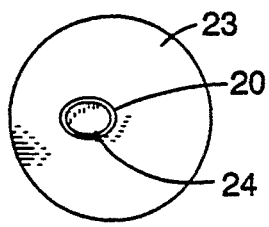
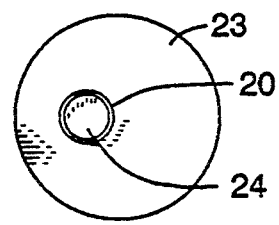
FIG. 7B          FIG. 8B          FIG. 9B
FIG. 7C          FIG. 8C          FIG. 9C
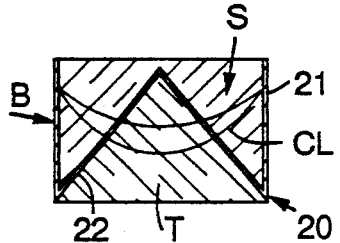
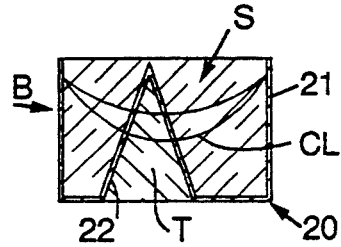
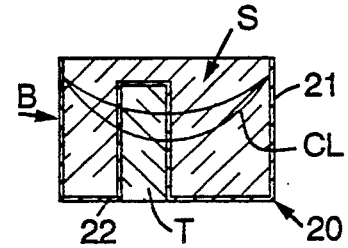
FIG. 7A          FIG. 8A          FIG. 9A
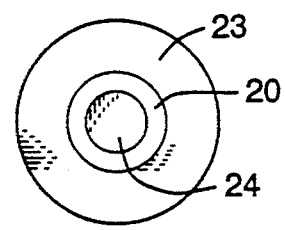
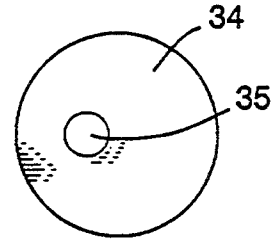
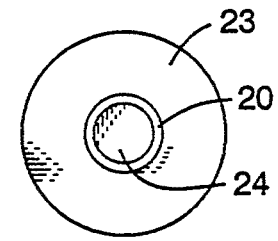
FIG. 10B         FIG. 11B         FIG. 12B
FIG. 10C         FIG. 11C         FIG. 12C
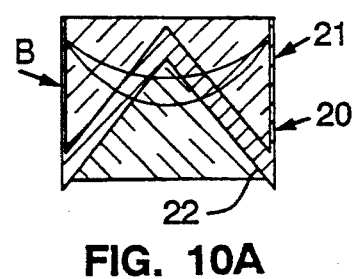
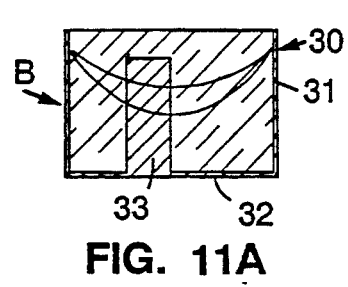
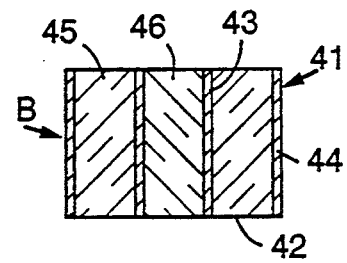
FIG. 10A         FIG. 11A         FIG. 12A

METHOD OF MANUFACTURING A CONTACT LENS

BACKGROUND OF THE INVENTION

1. Field of the Invention

This invention relates to a method of manufacturing a contact lens, and, in particular, to a method of manufacturing a contact lens from two or more differing materials, for example a composite lens, bifocal or trifocal lens.

2. State of the Art

Normally contact lenses when formed from two or more materials are formed with a first member formed from a first material, and a second member formed from a second material. One particular example of this is a composite lens which is generically known as "Saturn" in the industry wherein the first member comprises the optical zone of the lenses and is normally made from a "hard" material such as a rigid gas permeable (RGP) material, and the second member comprises a skirt around the optical zone and is normally made from a "soft" material, such as a hydrogel material. At present composite lenses of the general type described above are manufactured from buttons that are formed by the following process steps:

forming a first rod of material by polymerisation of a first monomer material;

forming a layer of a second material about said first rod of material by polymerisation and transversely slicing the rod so formed into buttons.

The problems associated with the above mentioned manufacturing technique for the button include:

the fact that the first rod of material must be located centrally within the finished buttons. With the procedures employed in the industry this is not so easily achieved, and consequently there is considerable scope for error from this aspect, leading to a high rejection level of rods and buttons;

the actual diameter of the first rod of material provides the dimensions of a significant characteristic of the finished lens. Therefore the first rod of material has to have a uniform diameter; and the adhesion between the two materials of the two members as a result of the different character of the materials of the composite lens may be very low, and when this is combined with the fact that the soft contact lens material will be swollen after manufacture and prior to use exerting a considerable force on this adhesion the problems can be significant.

The net result of the above is that the production of composite contact lens using buttons in accordance with the above detailed method is expensive, with a high rejection of rods, buttons and lens.

Above the situations and problems have been discussed with regard to one particular example, namely a "Saturn" lens, it should however be noted that the situation and problems ape very similar to those that would be encountered for the production of bifocal and other multifocal lenses from two of mope different polymeric materials.

SUMMARY OF THE INVENTION

The present invention is concerned with providing a method of manufacturing contact lenses for example composite contact lenses of multifocal contact lenses in which the above discussed problems have at least been alleviated of reduced significantly.

In accordance with the present invention in its broadest scope, there is disclosed a method of manufacturing a contact lens which has a first section formed from a first material, and a second section formed from a second material which method includes the use of a casting mould of generally cylindrical construction and having a side wall and an end wall, which end wall has an inward displacement into the space defined by the side wall, which space defined by the side wall and end wall is a receptive well into which material can be cast to be cured/polymerised, which method comprises casting a first monomer material into the receptive well of the casting mold, and polymerising/curing the monomer material; and machining the article formed by the above casting into a contact lens wherein the first monomer material includes a polymerisable material which has a penetrating like action with respect to the material from which the end wall of the casting mould is formed.

The casting moulds for use in the method of manufacture of the present invention, can be mass produced from suitable contact lens materials relatively cheaply and with a high degree of accuracy. For example the moulds may be produced by moulding of the material in a polystyrene mould. The polystyrene mould itself being injection moulded at a very low cost.

From this it will be readily understood by those in the industry that contact lenses which are made from two or more different materials can be made by the method in accordance with the present invention cheaply and easily, as the problems of the currently known process are significantly alleviated if not eliminated altogether.

In one arrangement of the present invention the inward displacement of the end wall of the casting mould is a solid projection the material of which forms one of the sections of the contact lens.

Alternatively, the inward displacement of the end wall of the casting mould may define a second receptive well into which a second monomer material may be cast, and subsequently polymerised/cured prior to machining. In accordance with a second aspect of the present invention a method of manufacturing a contact lens which has a first section formed from a first material, and a second section formed from a second material, includes the use of a casting mould of cylindrical construction and having a side wall and an end wall, which end wall has an inward displacement into a space defined by the side wall so that the casting mould has two receptive wells for the casting of material to be cured/polymerised which are separated from one another by the end wall of the casting mould, which method comprises:

casting a first monomer material into one of the receptive wells of the casting mould, and polymerising/curing the monomer material;

casting a second monomer material into the other receptive well of the casting mould, and, polymerising/curing the monomer material; and machining the article formed by the above castings into a contact lens wherein the first and second monomer materials include a polymerisable material which has a penetrating like action with respect to the material from which the end wall of the casting mould is formed.

The inclusion in the first and second monomer materials of a polymerisable material with a penetrating like action with respect to the material of the end wall of the casting mould means that the polymerisable material softens, swells and/or dissolves the surface material of the end wall of the casting mould and upon polymerisation a very strong bonded interface is produced between the monomer material cast and the end wall of the casting mould. In fact the bond strength of a button made in accordance with the present invention is significantly increased over that which would be present should the two materials have been placed in direct contact bonding.

When both of the casting operations have been completed a button is formed which includes the end wall of the casting mould sandwiched between the two bodies of polymerised first and second monomer material, each of the bodies of polymerised first and second monomer material being strongly bonded to the respective surface of the end wall of the casting mould as discussed in the paragraph above.

DETAILED DESCRIPTION OF THE PREFERRED EMBODIMENTS

The incorporation of the casting mould, or a part thereof, into the button means that the method in accordance with the present invention utilises a simple one or two stage cast moulding operation which is significantly cheaper to operate than the presently used method.

The accuracy of the alignment of the two materials, centre and skirt, is easily achieved by accurate manufacture of the casting mould, for example, by injection moulding. Consequently centration is ensured by the mould. In a preferred embodiment of the present invention the casting mould is formed with a side wall and end wall that are formed from the same material, so a strong interface is also formed between the cast material and the side wall.

Preferably, the end wall has an inward displacement into the space defined by the side wall of the casting mould which inward displacement is conical in shape.

The cone so formed as the inward displacement may have a base area which is any proportion of the area of the end wall of the mould up to 100%. Further the cone may be located with its apex at the, or in line with the, centre of the end wall or off centre therefrom.

Alternatively, the inward displacement in the end wall of the mould may comprise an upstanding cylinder. The upstanding cylinder may be of any suitable cross-sectional shape, for example, circular, oval, semi-circular or polygonal.

From the above it will be clearly apparent to anyone skilled in the industry that the method in accordance with the present invention can be used to manufacture contact lenses which have a member (or members).

The use of a casting mould having an inward displacement means that the two receptive wells of the casting mould are defined as follows
  one receptive well which is defined by the inward displacement in the end wall of the casting mould only; and
  one receptive well which is defined by the side wall and the end wall.

In one particular arrangement of the present invention the end wall of the casting mould, at least, is formed from polymethylmethacrylate and the polymerisable material with a penetrating like action of the first and second monomer materials is methylmethacrylate.

As will be well appreciated by those skilled in the art there is a close relationship between the choice of the mould material and the polymerisable material with a penetrating like action, and the example given above is only that and is not to be construed as limiting on the invention as disclosed.

As a general point liquid vinyl polymers and their monomers are useable in the present invention, for example, styrene, N-vinyl pyrrolidone (NVP), hydroxyethylmethacrylate (HEMA), dimethyl acrylamide (DMA), ethyleneglycoldimethacrylate (EGDMA), glyceral methacrylate (GMA).

In a first specific alternative of this arrangement of the present invention the end wall of the casting mould, at least, is formed from cellulose acetate butyrate (Eastman Kodak TENITE M6 350A), resin and plasticiser, with the polymerisable material with the penetrating like action of the first and second monomer materials being a liquid vinyl monomer such as methyl methacrylate.

In a second alternative to the first arrangement of the present invention the end wall of the casting mould, at least, is formed from polystyrene with the polymerisable material with penetrating like action of the first and second monomer materials being a liquid vinyl monomer such as N-vinyl pyrrolidone.

In one particular arrangement of the present invention the end walls of the casting moulds, at least, are coloured. The colouring of the casting mould end wall, means that when the finished lens has been cut/turned from the moulded bottom, the material of the first member and the second will be divided by a coloured ring like zone.

In one particular use of this aspect of the present invention, the colouring of the casting mould can be used to provide in the finished contact lens a lens locating tint which can be introduced into the finished lens without any inconvenience to the lens wearer, and little additional cost, whilst providing the advantages associated with locater tints.

Alternatively, the colouring of the casting mould in the fashion disclosed can be used to provide a ring of distinct colour where required.

Additionally it should be noted that because the casting mould has distinct cast moulding areas i.e., one or more receptive wells, and a mould each of the distinct zones of the finished contact lens can be coloured or not separately to provide an adaptable method of manufacturing contact lens.

The casting moulds for use with the method of the present invention are obviously formed with sufficient thickness of material to provide the strength necessary to ensure that no deformation is experienced during the casting of the monomer materials, and subsequent curing/polymerisation thereof. However, the end wall of the casting mould should not be of such thickness that it begins to interfere with the optical properties of the finished contact lens.

Preferably, the end wall of the casting mould has a thickness in the region of 0.1 mm to 2 mm.

In a majority of cases where the method of manufacturing a contact lens in accordance with the present invention is used, the casting mould for use therewith has an end wall which is of a fairly uniform thickness, with respect to the side wall of the casting mould.

However in some circumstances it is envisaged that the thickness of the end wall will vary across said end wall. Now in the situation that the end wall has a conical inward displacement the variation in thickness of the end wall may occur up the sides of the cone to its apex. Further in the situation where the inward displacement is an upstanding cylinder which forms a second receptive well for containing a suitable material and polymerisation thereof the variation in thickness of the end wall may occur around the side(s) of the upstanding cylinder.

Clearly, with regard to the thickness of the end wall of the casting mould the above comments mope readily apply to casting moulds which have two receptive wells for the casting of material. Now, in the situation where the casting mould has a solidly formed inward displacement, the limitations mentioned above will not apply at least to the area of the inward displacement.

The present invention may be used to manufacture contact lenses from any combination of materials of types of materials, for example hard and hard, hard and soft, and soft and soft.

The term "hard contact lens material" is well known in the industry and within the general terms there is included a large variety of materials. Most preferably, the hard contact lens material is a rigid gas permeable material, such as Fluorocon.

The term "soft contact lens material" is well known in the industry, and is the general term used in respect of hydrogel materials, that is materials which can be readily hydrolised/swollen under the action of water. Typically these materials are very soft and flexible in nature once hydrolysed.

Alternatively the "soft contact lens material" may be a silicone.

Preferably, the soft contact lens material is a hydrogel, such as that disclosed in co-pending application No. 641273.

BRIEF DESCRIPTION OF THE DRAWINGS

The invention will now be illustrated, by way of description of an example, with reference to the accompanying drawings, in which:

FIG. 7A is a sectional view of a cast button for making a contact lens according to a second embodiment of the present invention;

FIG. 7B is a plan view of a lens made from the cast button of FIG. 7A;

FIG. 7C is a side view of the lens shown in FIG. 7B;

FIG. 8A is a sectional view of a cast button for making a contact lens according to a third embodiment of the present invention;

FIG. 8B is a plan view of a lens made from the cast button of FIG. 8A;

FIG. 8C is a side view of the lens shown in FIG. 8B;

FIG. 9A is a sectional view of a cast button for making a contact lens according to a fourth embodiment according to the present invention;

FIG. 9B is a plan view of a lens made from the cast button of FIG. 9A;

FIG. 9C is a side view of the lens shown in FIG. 9B;

FIG. 10A is a sectional view of a cast button for making a contact lens according to a fifth embodiment according to the present invention;

FIG. 10B is a plan view of a lens made from the cast button of FIG. 10A;

FIG. 10C is a side view of the lens shown in FIG. 10B;

FIG. 11A is a sectional view of a cast button for making a contact lens according to a sixth embodiment according to the present invention;

FIG. 11B is a plan view of a lens made from the cast button of FIG. 11A;

FIG. 11C is a side view of the lens shown in FIG. 11B;

FIG. 12A is a sectional view of a cast button for making a contact lens according to a seventh embodiment according to the present invention;

FIG. 12B is a plan view of a lens made from the cast button of FIG. 12A; and

FIG. 12C is a side view of the lens shown in FIG. 12B;

DESCRIPTION OF PREFERRED EMBODIMENTS

Figure 1:
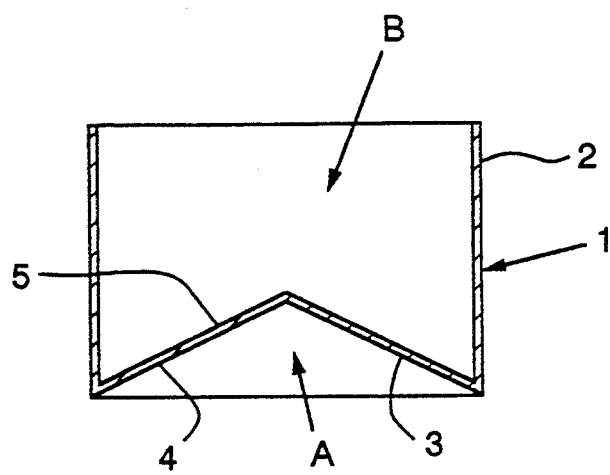
FIG. 1 shows a side view cross section of a casting mould for use in a method of manufacturing a contact lens in accordance with the present invention.

Now referring to FIG. 1 of the accompanying drawings there is shown a casting mould 1 for use in a method of manufacturing a contact lens in accordance with the present invention.

The casting mould 1 is of cylindrical construction having a side wall 2 and an end wall 3. The end wall 3 is inwardly displaced into the space defined within the side wall 2, and is of conical construction.

With this configuration the casting mould 1 defines two receptive wells for holding liquid material. The first of these wells A is defined by surface 4 of the end wall 3, and is external of the cylindrical side wall 2 of the casting mould 1. The second of the receptive wells B is defined by surface 5 of the end wall 3 and the cylindrical side wall 2 of the casting mould 1. The wells A and B are located on opposite sides of the end wall 3.

The end wall 3 of the casting mould has a thickness of 1.0 mm.

Now referring to FIGS. 2 to 6 of the accompanying drawings, a method of manufacturing a contact lens in accordance with the present invention will now be described.

The casting mould 1 is located so that the receptive well A thereof is capable of holding liquid monomeric material. The liquid monomeric material of a first material is poured into the receptive well A and polymerised.

When this polymerisation has been completed the receptive well A is filled with a hardened mass of polymeric material which is retained in place by the interaction of the cast monomeric material with the material of the end wall 3. The mould is now reversed and the receptive well B filled with liquid monomer of a second material which is then polymerised.

Figure 3:
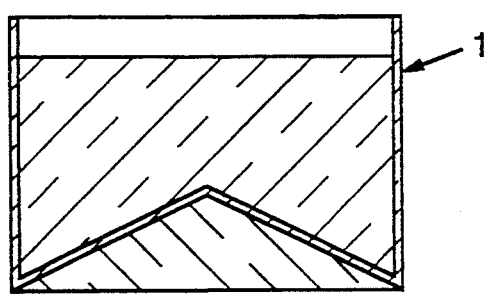

Once this second polymerisation operation is completed, a button as shown in FIG. 3 is formed.

Figure 4:
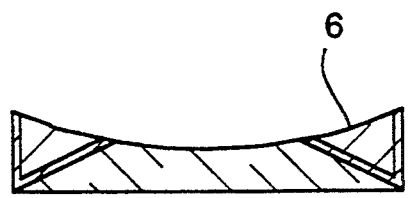
FIGS. 2 to 4 show schematic representations of a method in accordance with the present invention.
Figure 2:
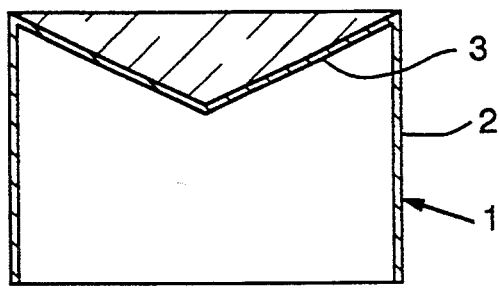

In order to complete the manufacture of the contact lens a first optical surface 6 is machined onto the button as shown in FIG. 4. The button is reversed and the second optical surface 7 is machined thereon.

Figure 5:
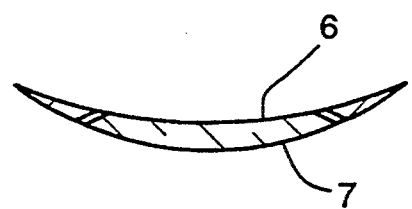
FIG. 5 shows a schematic side view cross section of a contact lens made in accordance with the present invention.
Figure 6:
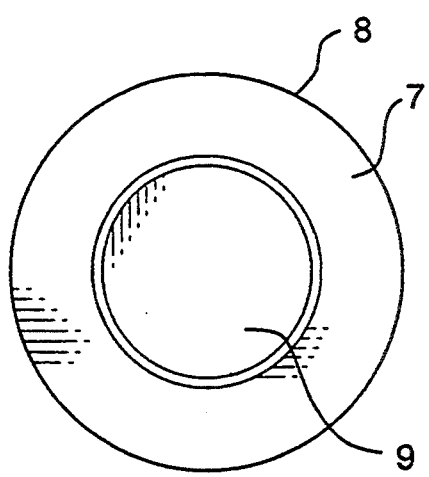
FIG. 6 shows a schematic plan view of the contact lens shown in FIG. 5 of the accompanying drawings.

A contact lens so formed is shown in FIGS. 5 and 6 of the accompanying drawings. This contact lens comprises:

a skirt 8 formed from the material cast into the receptive well B of the casting mould 1 and a central area 9 formed from the material cast into the receptive well A of the casting mould 1.

Once the contact lens has been machined from the button as described above, the material of the skirt 8 can then be hydrolysed/and swollen to provide the material with its soft and pliable nature. This is done in accordance with the well known procedures currently used in the industry.

The actual diameter of the central area 9 formed in the contact lens, because of the conical nature of the receptive well A of the casting mould 1 is dependent upon the depth of cut used to form the contact lens from the button. Therefore by adjusting the depth of cut used to form the contact lens from the button the size of the central area 9 can be adjusted to the wearer's requirements and the lighting background in the area he lives.

It will also be noticed that the interface between the sheet 8 and the central area 9 is quite marked in appearance. The effects of this interface can be adjusted by changing the angle of the conical end wall 3 and the thickness of the lens to provide the required characteristics.

EXAMPLE 1

A contact lens as described above is formed by the above method as follows using a casting mould 1 which is formed with an end wall that is made from polymethyl methacrylate (PMMA).

The central area 9 (formed from the monomer material cast into receptive well A of the casting mould 1) is formed from a monomer mixture with the following composition:

| | |
|---|---|
| 3 Methacryloxy propyl tris (trimethyl-siloxy) silane | 45% |
| 1,3 bis (3 methacryloxypropyl) tetra bis (trimethyl siloxy) disiloxane | 15% |
| Methyl methacrylate | 25% |
| Methacrylic acid | 9% |
| Ethylene glycol di methacrylate | 5.5% |
| 2,2 azobis (2 methyl propane nitrile) | 0.5% |

The skirt 8 (formed from the monomer material cast into receptive well B of the casting mould 1) is formed from a monomer mixture with the following composition:

| | |
|---|---|
| Hydroxy ethyl methacrylate | 69% |
| Polyethylene glycol | 30% |
| Ethylene glycol di methacrylate | 0.5% |
| 2,2 azobis (2 methyl propane nitrile) | 0.5% |

The contact lens is then cut with the central area 9 having a diameter of 9.00 mm and the skirt 8 having a diameter of 14.00 mm.

Now turning to FIG. 7A of the accompanying drawings which shows a cast moulded button B, and a cross-sectional view and plan view of a contact lens manufactured from the button B.

The button B is cast moulded with a casting mould 20 which is incorporated into the finished button B. The casting mould 20 is manufactured from polymethylmethacrylate and is of generally circular configuration having a side wall 21 and a base wall 22. The base wall 22 of the casting mould is inwardly displaced in the shape of a regular cone into the space surrounded by the side wall 21, with the apex of the cone in line with the central axis of the side wall 21.

With the shaping of the casting mould as described above two receptive wells suitable for casting of polymeric material are defined; these are:

space S defined by the side wall 21 and the base wall 22 and into which the material from which the second member is formed is cast; and space T defined by the inward displacement in the base wall 22 and into which the material from which the first member is formed is cast.

In one particular example the material cast into the space S is a hydrogel material which is of the following composition

| | |
|---|---|
| Hydroxyethyl methacrylate | 69% |
| Polyethylene glycol | 30% |
| Ethylene glycol dimethacrylate | 0.5% |
| 2.2 azobis (2 methylpropane nitrile) | 0.5% |
| and the material cast into the space T is | |
| 3 Methacryloxypropyltris(trimethyl-siloxy) silane | 45% |
| 1,3 bis(3 methacryloxy propyl)tetrabis (trimethylsiloxy) disiloxane | 15% |
| Methylmethacrylate | 25% |
| Methacrylic acid | 9% |
| Ethylene glycol dimethacrylate | 5.5% |
| 2,2 azobis (2 methyl propane nitrile) | 0.5% |

Now in FIG. 7 the outline CL in the button shows the position of a contact lens which is to be machined from the button.

Further there is shown in FIG. 7B a cross sectional view and a plan view of a contact lens so machined from the button. The lens has an outer member 23 and an inner member 24, these members are separated from one another by the moulding cast 20.

Now turning to FIGS. 8A and 8B of the accompanying drawings there is shown in FIG. 8A another cast moulded button B and in FIG. 8b a cross-sectional view and a plan view of a contact lens manufactured from the button B.

The description of this button B and the contact lens CL formed therefrom are very similar to that discussed with reference to FIGS. 7A and 7B and consequently like numerals have been used to indicate like components.

Now in this particular case the differences are in the shape and position of the inward displacement in the base wall 22.

In this case the inward displacement in the base wall is again conical in shape, however is slightly offset from the axis which runs through the casting mould case 20. The net result of this can be clearly seen from the plan view of the contact lens, illustrated in FIG. 8B in that the first member is elliptical in shape, and not circular as in the example discussed with respect to FIGS. 7A and 7B of the accompanying drawings.

The button B and the contact lens CL formed therefrom are formed from the same materials as discussed with regard to FIGS. 7A and 7B of the accompanying drawings.

Now turning to FIGS. 9A and 9B of the accompanying drawings in which there is shown another form of cast button B, with cross-sectional view and plan view of a contact lens manufactured therefrom.

The description of this button and the contact lens formed therefrom are very similar to that discussed with reference to FIGS. 7A and 7B of the drawings, and consequently like numerals have been used to indicate like components.

In this particular case the differences are in the shape and position of the inward displacement of the base wall 22.

The inward displacement in the base wall 22 is cylindrical in shape, the central axis of the displacement being offset from the central axis of the moulding cast.

Consequently, when the contact lens is machined from the cast button B as with the contact lens discussed with regard to FIGS. 8A and 8B of the accompanying drawings the first member is elliptical in shape, and not circular.

The button B and the contact lens CL formed therefrom are formed from the same materials as discussed with regard to FIGS. 7A and 7B of the accompanying drawings.

Now turning to FIGS. 10A and 10B of the accompanying drawings in which another form of cast button B, and contact lens manufactured therefrom are shown.

The description of this button and the contact lens formed therefrom are very similar to that discussed with reference to FIGS. 7A and 7B of the accompanying drawings and, consequently, like numerals have been used to describe like components.

In this case the differences are in the contraction of the casting mould 20 in the vicinity of the base. Previously, the casting mould 20 has been made so that the side wall 21 and the base wall 22 are of equivalent thickness. In the example now being illustrated the base wall 22 is of much greater thickness than the side wall 21. The net effect of this is clearly shown in the plan view of the contact lens machined from the button B, where the barrier between the first and second members of the contact lens provided by the casting mould 20 is much thicker than with the previous examples. Further, by having a higher refractive index of the casting mould material, a concentric bifocal lens is prepared.

The button B and the contact lens CL formed therefrom are formed with the same materials as discussed with regard to FIGS. 7A and 7B of the accompanying drawings.

Now turning to FIGS. 11A and 11B of the accompanying drawings, there is shown another form of cast button B, and cross-sectional view and plan view of a contact lens manufactured therefrom.

In this case a casting mould 30 is manufactured from polystyrene, and comprises a cylindrical side wall 31 with a base wall 32. The base wall 32 has an upstanding solid post member 33 which has an axis slightly offset kept parallel to the equivalent axis of the casting mould as a whole.

Now the casting mould 30 in this case may be manufactured by injection moulding into this particular fashion or, alternatively, a casting mould similar to that shown in FIGS. 9A and 9B of the accompanying drawings may be used with the space T having polymer identical to that from which the casting mould 30 is made, cast and polymerised therein.

In any event the casting mould only defines one receptive well for the casting of material to form the button. In this case polymeric material of the following composition is cast into the receptive well.

| | |
|---|---|
| Hydroxy ethyl methyl/methacrylate | 69% |
| Polyethylene glycol | 30% |
| Ethylene glycerol dimethacrylate | 0.5% |
| 2,2 azobis (2 methyl propane nitrile) | 0.5% |

Once polymerised the cast button B may be machined to form a contact lens which has a first member 34 formed from the material of the upstanding post of the casting mould and a second member formed from the material cast into the receptive well of the mould.

Finally turning to FIGS. 12A and 12B of the accompanying drawings a seventh basic design of cast button B and contact lens CL formed therefrom is shown.

In this particular example, the cast button B is formed using a casting mould 41 which is incorporated into the cast button B.

The casting mould 41 in this case is manufactured from an optically clear material, such as polystyrene. The mould 41 includes;
 an end wall 42,
 a first side wall 44 which circumferentially surrounds the periphery of the end wall 42 and is connected thereto; and
 a second side wall 43 which is connected to the end wall 42 within the space defined by the first side wall 44 and is upstanding therefore.

A casting mould 41 of this fashion defines two receptive wells 45 and 46 into which polymeric monomer material can be cast in order to enable the forming of a cast button B, one of which receptive wells 46 is circumferentially surrounded by the other receptive well 45.

The receptive well 45 is defined by the inner surfaces of the first side wall 44 and the end wall 42 and the outer surface of the second side wall 43.

The receptive well 46 is defined by the inner surfaces of the second side wall 43 and the end wall 42. The second side wall 43 constitutes an inward displacement of the end wall 42. Both of the wells 45, 46 are located on the same side of the end wall 42.

In the formation of a cast button B liquid monomeric material is cast into the receptive wells 45 and 46 and polymerised.

The method of casting a button using this casting mould 41 may be identical with that disclosed above for the formation of the casting button. However with the casting button of the above type the receptive wells 45 and 46 are disposed on the same side so the liquid monomer material may be cast into the appropriate receptive well and polymerised/cured simultaneously. That is to say the first polymerising/curing step of the earlier detailed method has been leftout.

In one particular example the liquid monomeric material cast into receptive well 45 comprises

| | |
|---|---|
| Hydroxyethylmethacrylate | 69% |
| Polyethylene glycol | 30% |
| Ethylene glycol dimethacrylate | 0.5% |
| 2,2 azobis(2 methylpropanenitrile) | 0.5% | and the liquid monomeric material cast into receptive well 46 comprises

| | |
|---|---|
| 3 Methoxyloxypropyltris(trimethyl-siloxyl silane | 45% |

-continued

| 1,3 bis(3 methacryloxypropyl)tetra bis(trimethylsiloxy)disiloxane | 15% |
| Methylmethacrylate | 25% |
| Methacrylic Acid | 9% |
| Ethylene glycol dimethacrylate | 5.5% |
| 2,2 azobis(2 methylpropanenitrile) | 0.5% |

What we claim is:

1. A method of manufacturing a contact lens which has a first optical section formed from a first monomer material, and a second optical section formed from a second monomer material which method includes the use of a single casting mould of generally cylindrical construction and having a side wall and an end wall, which end wall has an inward displacement into the space defined by the side wall, a volume defined by the side wall and end wall is a receptive well into which material can be cast to be cured/polymerised, which method comprises casting the first monomer material into the receptive well of the casting mould, and polymerising/curing the monomer material; and machining the article formed by the above casting into a contact lens wherein the first monomer material includes a polymerisable material which forms a bonded interface with the material from which the end wall of the casting mould is formed and further wherein the inward displacement of the end wall of the casting mould is a solid projection formed of the second monomer material and which forms the second section of the contact lens.

2. A method of manufacturing a contact lens which has a first optical section formed from a monomeric first material, and a second optical section formed from a second monomer material which method includes the use of a single casting mould of generally cylindrical construction and having a side wall and an end wall, which end wall has an inward displacement into the space defined by the side wall, a volume defined by the side wall and end wall is a receptive well into which material can be cast to be cured/polymerised, which method comprises casting the first monomer material into the receptive well of the casting mould, and polymerising/curing the first monomer material; and machining the article formed by the above casting into a contact lens wherein the first monomer material includes a polymerisable material which forms a bonded interface with the material from which the end wall of the casting mould is formed and further wherein the inward displacement of the end wall of the casting mould defines a second receptive well located on the opposite side of the end wall from the first receptive well and into which the second monomer material is cast, and subsequently polymerized/cured prior to machining.

3. A method of manufacturing a composite contact lens which has a first optical section, formed from a first monomer material, and a second optical section formed from a second monomer material includes the use of a casing mould of cylindrical construction and having a side wall and an end wall which end wall has an inward displacement into a space defined by the side wall so that the casting mould has two receptive wells for the casting of material to be cured/polymerised which are separated from one another by the end wall of the casing mould, which method comprises:

casting the first monomer material into one of the receptive wells of the casing mould, casting the second monomer material into the other receptive well of the casting mould, polymerising/curing the first and second monomer materials in the receptive wells;

machining the article formed by the above castings into a contact lens wherein the first and second monomer materials include a polymerisable material which forms a bonded interface with the material from which the end wall of the casting mould is formed.

4. A method as claimed in claim 3, wherein the first monomer material is polymerised/cured prior to the casting of the second monomer material.

5. A method as claimed in claim 3, wherein the first and second monomer materials are polymerised/cured simultaneously.

6. A method of manufacturing a composite contact lens as claimed in claim 1, wherein the casting mould is formed with a side wall and end wall that are formed from the same material, so a strong interface is also formed between the cast material and the side wall.

7. A method of manufacturing a contact lens as claimed in claim 6, wherein the casting mould is formed from a thermoplastic material.

8. A method of manufacturing a composite contact lens as claimed in claim 1, wherein the end wall has an inward displacement into the space defined by the side wall of the casting mould which inward displacement is conical in shape.

9. A method of manufacturing a composite contact lens as claimed in claim 1, wherein the inward displacement in the end wall of the mould comprises an upstanding cylinder.

10. A method of manufacturing a composite contact lens as claimed in claim 1, wherein the end wall of the casting mould, at least, is formed from polymethylmethacrylate and the material of the first and second monomer materials is methylmethacrylate.

11. A method of manufacturing a composite contact lens as claimed in claim 1, wherein the end wall of the casting mould, at least, is formed from polymethylmethacrylate and the material of the first and second monomer material is a methacrylate material.

12. A method of manufacturing a composite contact lens as claimed in claim 1, wherein the end wall of the casting mould, at least, is formed from cellulose acetate butyrate, and the penetrating like material of the first and second monomer materials is a liquid vinyl monomer material.

13. A method of manufacturing a composite contact lens as claimed in claim 1, wherein the end wall of the casting mould, at least, is formed from polystyrene, and the material of the first and second monomer material is a liquid vinyl monomer material.

14. A method of manufacturing a composite contact lens as claimed in claim 1, wherein the end wall of the casting mould is coloured.

15. A method of manufacturing a composite contact lens as claimed in claim 1, wherein the end wall of the casting mould has a thickness in the region of 0.1 mm to 2.00 mm.

16. A method of manufacturing a contact lens as claimed in claim 1, wherein the end wall of the casting mould is any thermoplastic material compatible with the first monomer material.

17. A method of manufacturing a composite contact lens as claimed in claim 3, wherein the casting mould is formed with a side wall and end wall that are formed from the same material, so a strong interface is also formed between the cast material and the side wall.

18. A method of manufacturing a composite contact lens as claimed in claim 3, wherein the end wall has an inward displacement into the space defined by the side wall of the casting mould which inward displacement is conical in shape.

19. A method of manufacturing a composite contact lens as claimed in claim 3, wherein the inward displacement in the end wall of the mould comprises an upstanding cylinder.

20. A method of manufacturing a composite contact lens as claimed in claim 3, wherein the end wall of the casting mould, at least, is formed from polymethylmethacrylate and the material of the first and second monomer materials is methylmethacrylate.

21. A method of manufacturing a composite contact lens as claimed in claim 3, wherein the end wall of the casting mould, at least, is formed from polymethylmethacrylate and the material of the first and second monomer material is a methacrylate material.

22. A method of manufacturing a composite contact lens as claimed in claim 3, wherein the end wall of the casting mould, at least, is formed from cellulose acetate butyrate, and the material of the first and second monomer materials is a liquid vinyl monomer material.

23. A method of manufacturing a composite contact lens as claimed in claim 3, wherein the end wall of the casting mould is coloured.

24. A method of manufacturing a composite contact lens as claimed in claim 3, wherein the end wall of the casting mould has a thickness in the region of 0.1 mm to 0.2 mm.

25. A method according to claim 1, wherein the machining step comprises machining the article from a portion of the casting disposed intermediate opposite ends of the projection, such that the material of the projection extends completely through the contact lens.

26. A method according to claim 3, wherein the two receptive wells are located on the same side of the end wall.

* * * * *